United States Patent [19]

Jaskowiak

[11] Patent Number: 5,439,416
[45] Date of Patent: Aug. 8, 1995

[54] COMPOSITE SHAFT WITH INTEGRALLY MOLDED FUNCTIONAL FEATURE

[75] Inventor: Timothy R. Jaskowiak, Webster, N.Y.

[73] Assignee: Xerox Corporation, Stamford, Conn.

[21] Appl. No.: 633,562

[22] Filed: Dec. 24, 1990

[51] Int. Cl.⁶ ............................................. F16C 3/02
[52] U.S. Cl. ...................................................... 464/181
[58] Field of Search ................ 464/181, 183, 87, 185; 264/259, 46.4, 46.7, 45.1, 241, 273; 29/527.4, 453

[56] References Cited

U.S. PATENT DOCUMENTS

| | | | |
|---|---|---|---|
| 2,869,339 | 1/1959 | Drake | 464/87 X |
| 3,553,978 | 1/1971 | Williams | 464/181 |
| 3,659,434 | 5/1972 | Wolfe | 464/180 X |
| 3,716,612 | 2/1973 | Schrenk et al. | 264/241 |
| 3,968,561 | 7/1976 | Oakes et al. | 264/45.5 X |
| 4,063,429 | 12/1977 | Wilson | 264/46.7 X |
| 4,169,304 | 10/1979 | Binder | 264/46.6 X |
| 4,216,634 | 8/1980 | Binder | 264/46.6 X |
| 4,380,442 | 4/1983 | Amsel | 464/87 X |

FOREIGN PATENT DOCUMENTS 0248567  12/1987  European Pat. Off. ................ 67/18

Primary Examiner—Daniel P. Stodola

[57] ABSTRACT

A shaft assembly comprising an elongated member having at least a portion which is hollow, tubular, shell like having an inside surface defining a shaft core and an outside surface defining a shaft functional surface, the shaft core being filled with a hardened, moldable material, and the shaft functional surface having at least one functional feature thereon, which is of hardened, moldable material integrally molded with the hardened, moldable material in the shaft core. In a preferred embodiment the shaft assembly is rotatable and has at least one molding aperture gate extending through the shaft from the inside surface to the outside surface which is filled with hardened, moldable material which connects the hardened material in the shaft core and functional feature.

23 Claims, 6 Drawing Sheets

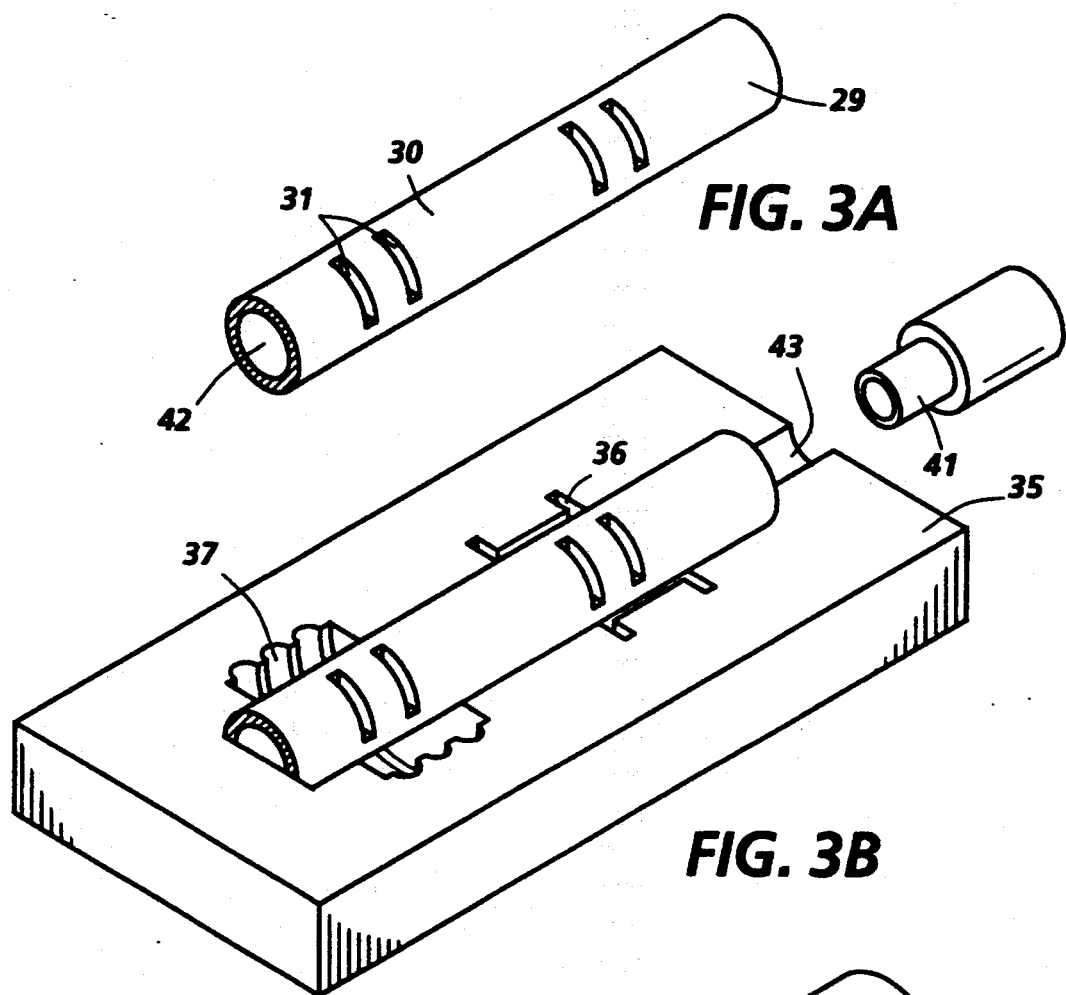
FIG. 3A
FIG. 3B
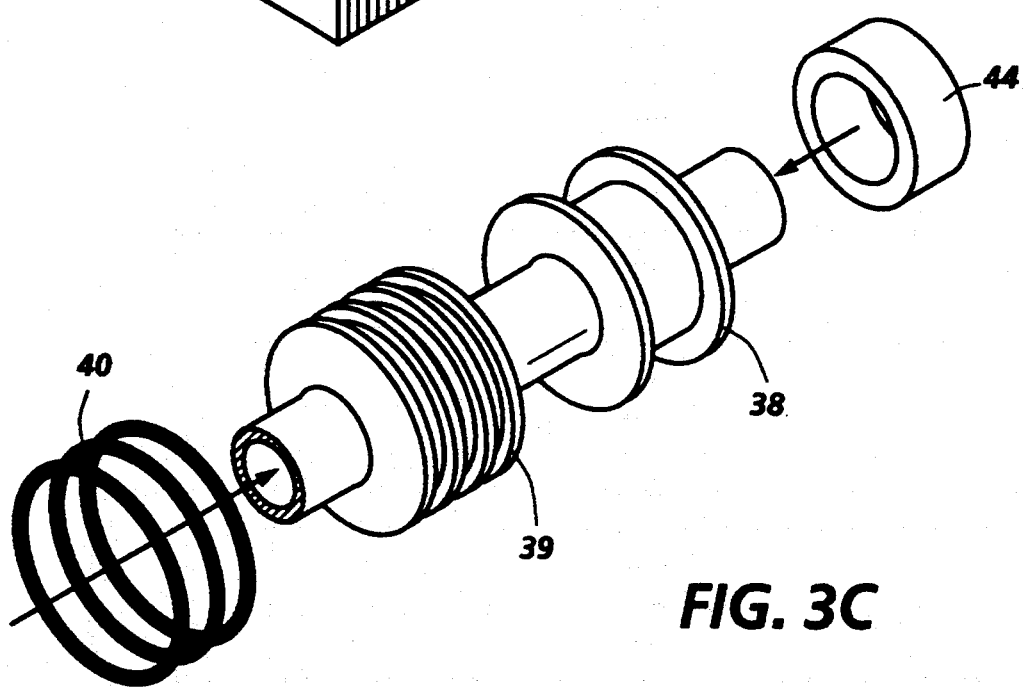
FIG. 3C

COMPOSITE SHAFT WITH INTEGRALLY MOLDED FUNCTIONAL FEATURE

BACKGROUND OF THE INVENTION

The present invention relates to a shaft for use in a machine to perform at least one operation. In particular, it relates to a light weight, low cost, composite shaft assembly having a hollow, tubular, shell like portion containing a hardened, moldable material within its core in communication with at least one molded feature on the outside or at the end of the tubular shell like portion.

While the present invention has utility in apparatus comprising various mechanical components, it has particular application and will henceforth be described with reference to electrostatographic reproducing apparatus. Briefly, and as illustrated in FIGS. 1 and 2, in electrostatographic printing apparatus commonly in use today a photoconductive insulating surface 10 which is typically the surface of a rotatably drum is charged to a uniform potential by a charge corotron 12 and thereafter exposed to a light image of an original document 15 to be reproduced on an exposure platen 16 by means of exposure lamp 17, the exposure discharging the photoconductive insulating surface in exposed or background areas creating an electrostatic latent image on the photoconductive insulating surface of the document. A developer unit 20 is which corresponds to the image areas contained within the apparatus and has developer material to developed the electrostatic latent image. Typically, the developer material has charged carrier particles and charged toner particles which triboelectrically adhere to the carrier particles and during development, the toner particles are attracted from the carrier particles to the charged areas of the photoconductive insulating surface. The developed image on the photoconductive insulating layer is subsequently transferred at a transfer station 24 to a support surface, such as copy paper 21, which is fed by feeder 22 to provide intimate transfer contact between the insulating area and the copy paper. The toner image on the copy paper is subsequently, permanently affixed on the copy paper by the application of heat and/or pressure in a fuser 23. Subsequent to the transfer of the toner image to the support surface, any residual toner remaining on the photoconductor is cleaned in a cleaner 24 in preparation for the next imaging cycle. FIG. 2 illustrates the claim shell nature of this machine having a lower frame member 25 and an upper frame member 26 which has two shafts, 27, 28 in the copy sheet transport system.

Alternatively, the electrostatic latent image may be generated from information electronically stored or generated in digital form which afterwards may be converted to alphanumeric images by image generation, electronics and optics. For further information on such apparatus, attention is directed to U.S. Pat. No. 4,372,668 to Malachowski et al., and U.S. Pat. No. 4,660,963 to Stemmle et al.

In these machines, shafts are typically used to provide a variety of features performing functions within the machines. For example, shafts typically have gears, rolls, pulleys or other drive mechanisms mounted thereon to enable driving various parts or systems in the machine. In addition, the shafts may have retention or location features such as, snaps, fitting elements or stops or may contain other features such as bearings, bushings, rollers, journals and O-rings. Initially, the shafts were typically made from solid materials such as, metals like, steel and aluminum, and the individual functional features or elements such as rollers or gears were individually mounted to the shaft and secured thereto. Typically, this assembly process was manually completed as it did not readily lend itself to automated assembly. While satisfactory in many respects, such shaft assemblies were both heavy and costly in that solid shafts contained more metal and therefore cost more. Each of the individual functional features had to be separately manufactured, separately assembled onto the shaft assembly, all of which increased both materials and assembly time and cost particularly when most of the functional features had to also be located and fixed by way of set screws or other such device to the shaft. Alternatively, the functional features have been formed on metal stock material by such conventional metal working techniques as turning, milling and grinding. In addition, the weight of such shaft assemblies provided a high moment of inertia which necessitated increased drive power requirements.

PRIOR ART

U.S. Pat. No. 3,659,434 to Wolfe discloses a tubular shaft having an outer metallic, tubular member filled with resin. The tube is cut to a preselected length and has a central passageway defined by the inner wall of the metal tube. The tube is heated and swaged and an injector nozzle is positioned at one end and resinous material is pumped into the cavity. See Col. 2, lines 26-61.

Additional progress in terms of cost and weight of the shaft assemblies has been observed in certain machines which use hollow drive shafts with molded or otherwise separately fabricated functional features such as, gears and rolls which are then manually placed on the shaft and secured in position.

SUMMARY OF THE INVENTION

In accordance with a principle feature of the present invention, a lightweight, low cost, easily manufacturable and assembliable shaft assembly is provided.

In particular, a shaft assembly is provided, which includes an elongated, hollow, tubular member having a core of a hardened, moldable material and having one or more functional features on the outside of the shaft or at least one end made of a hardened, moldable material which is connected to the core material by means of additional hardened, moldable material.

More specifically, the present invention is directed to an elongated member having at least a portion which is a hollow, tubular, shell having an inside surface defining a shaft core and an outside surface defining a shaft functional surface, the shaft core being filled with a hardened, moldable material and the shaft functional surface having at least one functional feature thereon, which is of the hardened, moldable material, integrally molded with the hardened, moldable material in the core.

In a further aspect of the present invention, there is at least one molding aperture gate extending through the shaft from the inside surface to the outside surface and the functional feature and hardened material in the core are connected by hardened, moldable material in the molding gate.

In a further aspect of the present invention, the hardened, moldable material is a thermoplastic or thermosetting resin which may or may not contain additional material to impart certain selected properties to the surface of the functional feature.

In a further aspect of the present invention, the hollow, tubular, shell like portion is generally circular in cross section and is made of aluminum, copper, stainless or other steel alloys.

In a further aspect of the present invention, the shaft has more than one integrally molded functional feature thereon, each of which may perform a function different from at least one of the other features or the same function as one of the other features.

In a further aspect of the present invention, the coefficient of thermal expansion of the hollow, tubular, shell like portion and the shrink rate of the thermoplastic are selected to provide intimate contact between the hardened thermoplastic and tubular shell like portion.

In a further aspect of the present invention, the hollow, tubular, shell like portion is an extrusion having a geometric pattern on its inside surface.

In a further aspect of the present invention, the shaft assembly includes at least one functional feature which is not integrally molded with the hardened material in the shaft core, but which is secured in place on the shaft assembly by hardened, moldable material in a molding gate and the shaft core.

In a further aspect of the present invention, the shaft assembly includes an additional operative feature which has been molded onto the surface of at least one functional feature.

In a further aspect of the present invention, the shaft assembly is fabricated by placing the hollow, tubular, shell like portion in a mold which has at least one cavity for at least one functional feature to be formed on the outside surface or an end of the shaft and filling the mold with a hardenable, moldable material, flowing it through the shaft core aperture gate and cavity to form the functional feature on the shaft assembly, permitting the hardenable material to harden, following which the shaft assembly is removed from the mold.

For a better understanding, as well as other objects and further features thereof, references is had to the following drawings and descriptions.

BRIEF DESCRIPTION OF THE DRAWINGS

FIGS. 3A and 3B and 3C are illustrations of the composite molding shaft process according to the present invention.

DESCRIPTION OF PREFERRED EMBODIMENT

Figure 1:
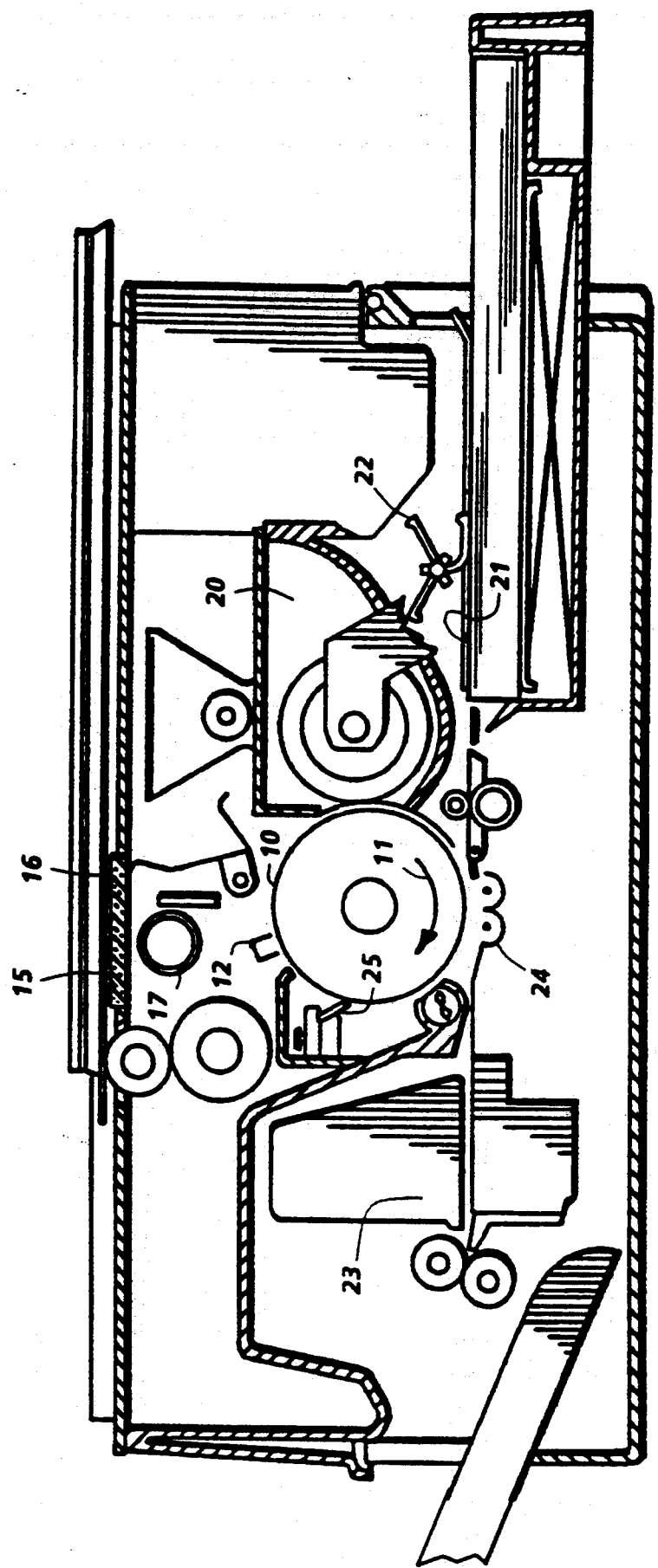
FIG. 1 is a schematic representation in cross section of the operational elements of an automatic reproducing machine having several shaft assemblies.

Attention is now directed to FIGS. 3A to 3C and 4 for a general over view of the the process according to the present invention and the shaft assembly produced thereby. As therein illustrated, a section of an elongated member 29 has hollow, tubular, shell like portion 30 having an outside surface 32 having a plurality of molding aperture gates 31 formed therein extending along the shaft from the inside surface 42 to the outside surface 32, such as by a laser machining after which the hollow tubing is placed in a mold 35 having cavities 36 and 37 for two functional features therein, illustrated as a pulley 38, and a support 39 for elastomer O-rings 40 to be subsequently added. The mold 35 is subsequently closed and a hardenable, moldable material injected from nozzle 41 into the mold with the hardenable material flowing through the core 43 defined by the inside surface 42 of the hollow tubing through the molding aperture gates 31 and into the mold cavities 36 and 37 to form the pulley 38 and elastomer O-rings support 39. During this molding process it is important to note that the hardenable, moldable material is fluid and flows through the core and is in flowing communication with the mold cavity by means of the aperture gate When the hardenable material has hardened the mold is opened and the composite shaft assembly is removed. The composite shaft may then be surface heated or otherwise finished with conventional techniques. As illustrated, additional items as desired may now also be added to the assembly, including an elastomer band 44 and elastomer O-rings 40.

With particular reference to FIGS. 9A to 9E, this process is in sharp contrast to prior art practices wherein the individual functional features there illustrated as two pulleys 45 were separately added to a shaft assembly and secured in place on both inboard and outboard sides by means of two fasteners 46. Typically, all the steps in this operation would be separately and manually performed.

Figure 4:
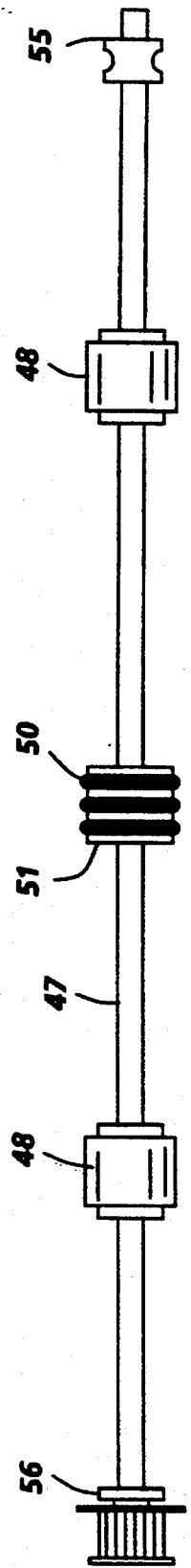
FIG. 4 is an isometric view of a shaft with several functional features integrally molded thereon.

FIG. 4 illustrates a shaft assembly 47 having a plurality of different functional features molded thereon, including a pair of drive rolls 48, a grooved support member 51 for the subsequent insertion of three O-rings 50, a locator roll 55 and a mount 56 for a gear which can be subsequently added. In this regard it is important to note that the type of feature that can be added to the shaft assembly is virtually unlimited, being limited only in that they must be capable of being formed during the molding process.

Figure 2:
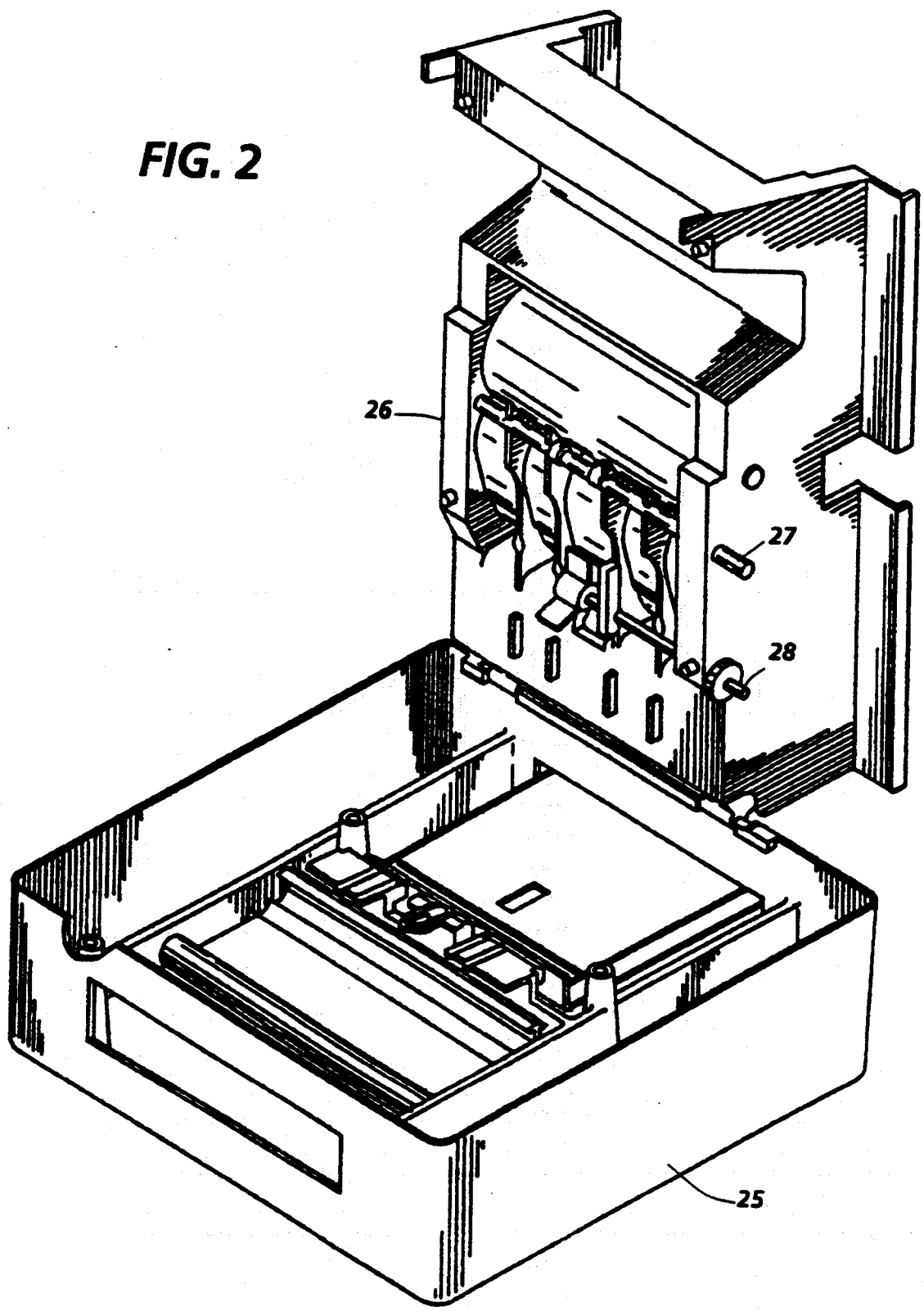
FIG. 2 is an isometric view of the upper and lower frame members which may have several shaft assemblies according to the present invention.

The shaft assemblies may be stationary or rotatable depending on the specific application. In the particular application, illustrated in FIGS. 1 and 2, most of the shaft assemblies are typically used to provide drives in document transports and print substrate transports, which may be simple to complex in operation and short to long in transport path distance and are therefore rotatable. In addition, they may have specific application in cleaner, fuser, developer and optics housing. The integrally molded features may be drive features such as gears, rolls and pulleys; location features such as snap fittings, holes or stops or other functional features such as bearings, bushings, journals, idlers, O-rings, flanges, frames, etc.

The elongated member having at least a portion which is hollow, tubular, and shell like, can be of virtually any cross section or made of any suitable material. Typically, it is circular but it may just as well be triangular or rectangular in shape. It may also be a seamless member or a seamed member. It may take the form of a protrusion or an extrusion, including one or more grooved or geometric support members on the interior of the composite shaft. Suitable materials include carbon steel, aluminum, copper, stainless steel, other steel alloys and composite materials or plastic material such as, for example a Teflon tube (Teflon is a trademark of E. I. Dupont deNemours Co.). Theoretically, there are few, if any dimensional limits on the inside diameter or outside diameter of, for example, a cylindrical tube, nor on the thickness of the wall it being noted that however, as a practical matter the smaller the internal diameter and longer the shaft the more difficult it is to insure that the flowable plastic will fill the entire shaft core aperture gates and mold cavities.

The hardenable, moldable material may be selected from a wide variety of materials which can be handled in a molding process and provide the characteristics and properties to the functional features including high or low friction, specific electrical properties, lubricity and the like. Typical injection moldable or castable materials include the thermoplastic and thermosetting resins. Typical thermoplastic resins include polyethylene, polystyrene, polypropylene, polyurethane, polyvinylchloride, nylons, polycarbonate ABS, as well as certain fluorocarbons, such as Teflon. Typical thermosetting resins include acrylics, phenolics and polyesters. The moldable material may be used in a filled or unfilled form and may be filled with materials to impart selected properties such as fire retardancy to the functional feature or rest of the shaft assembly. If desired, the moldable material may be foamed with the use a conventional blowing agent as in the the case of, for example, microcellular polyurethane. Further, the moldable material may be filled or unfilled with, for example, up to 30 parts by weight glass fibers per 100 parts by weight resin and may have added other ingredients for selected properties, such as pigments to impart a particular color or other materials for desired properties.

The molding aperture gates may be formed in any suitable shape in the hollow, tubular, shell with any suitable process. Typically, they may be drilled, punched, cut, laser machined, formed with a water jet or electrochemical machine and may be in the form of a round hole, shaped aperture slit or other suitable shape. It is important that the holes, gates or ports are sufficiently large and present in sufficient number to enable a flowable material to pass through them from the core into the cavity forming the functional feature on the hollow, tubular shell. In this regard it should be noted that a mold cavity may form a functional feature on an end of the tubular shell. In addition, while not critical, but beneficial, depending on the particular application of the shaft assembly, it may be desirable to select the materials from which the hollow, tubular, shell like member and the hardened material are made such that the coefficient of thermal expansion of the hollow, tubular, shell like portion and the shrink rate of the thermoplastic are such as to provide intimate contact between the hardened thermoplastic and the tubular shell like portion. For example, an integral, external roll feature would preferably have intimate contact with the outside diameter of the shell like portion which may, therefore, in the final analysis contribute to enhanced beam strength.

Figure 5:
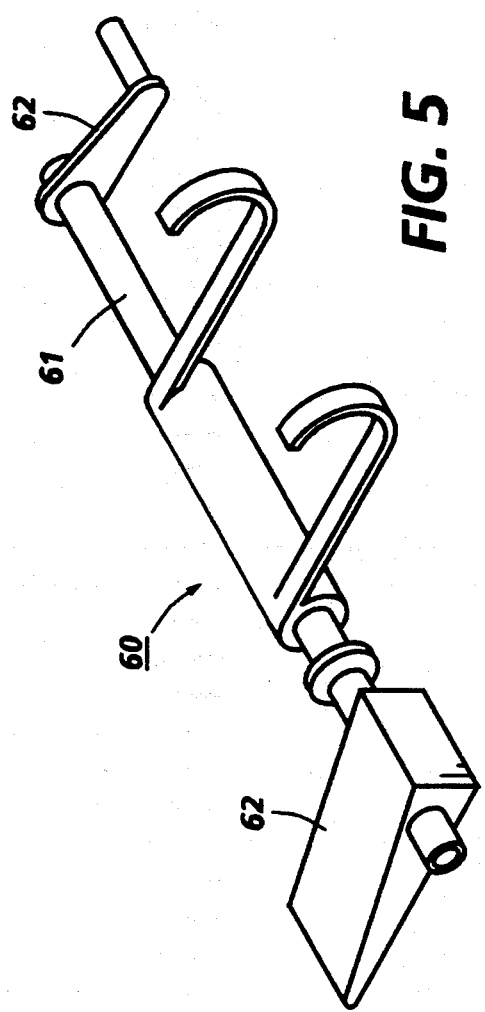
FIG. 5 is an isometric view of a shaft having a large plastic frame member integrally molded thereon.
Figure 6:
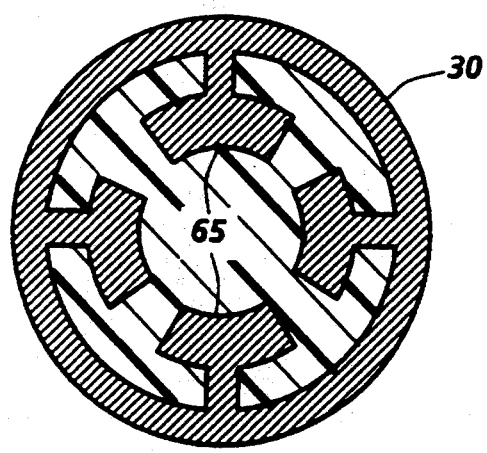
FIG. 6 is a cross sectional view of a shaft illustrating the hollow, tubular, shell like portion to have a splined interior.
Figure 7:
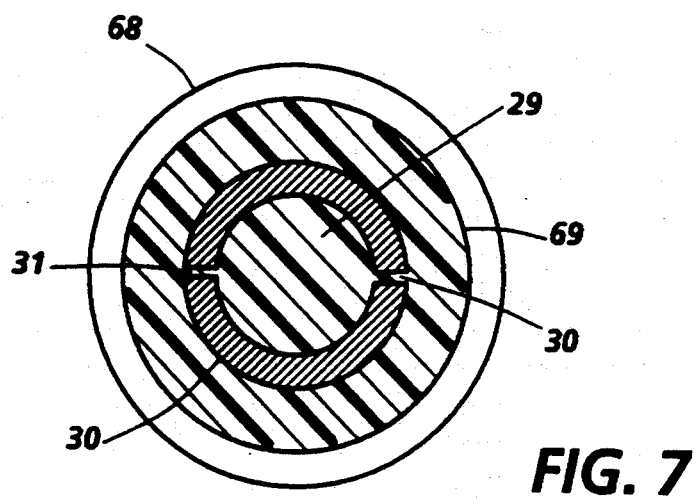
FIG. 7 is a cross sectional view through a section of the shaft where the molding process has been accomplished twice to place a coated operative surface on the integrally molded functional feature.
Figure 8:
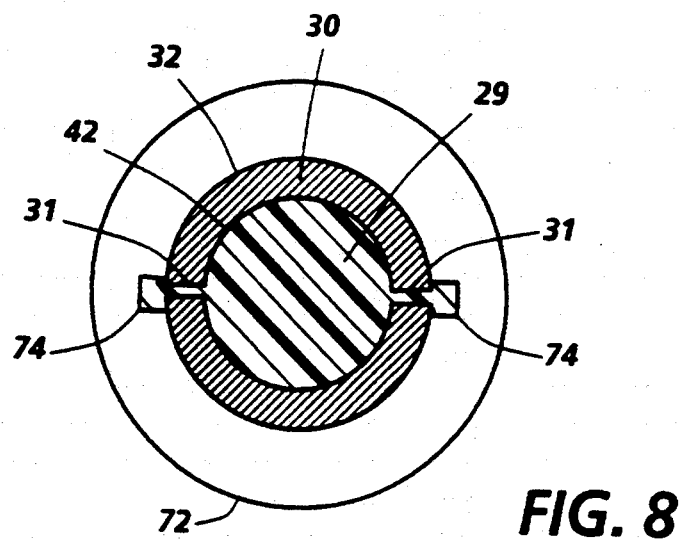
FIG. 8 is a cross sectional view through a separately fabricated, functional feature mounted on a shaft, but secured thereto in place by hardened, moldable material in the shaft core, molding gate and a securing slot in the separately fabricated feature.
Figure 9A:
FIGS. 9A to 9E are illustrations of hollow shaft assembly techniques according to the prior art.
Figure 9B:
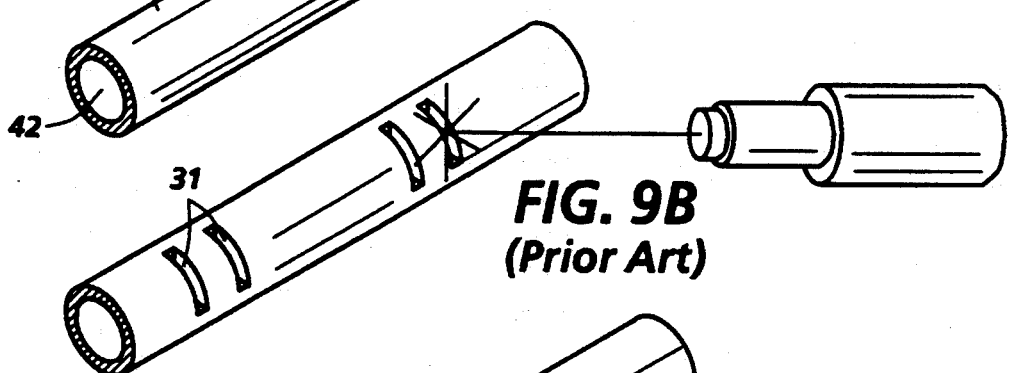
Figure 9C:
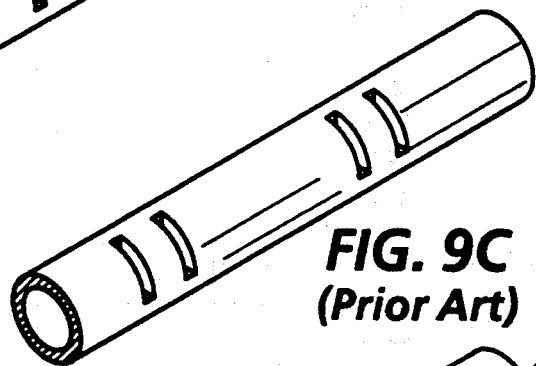
Figure 9D:
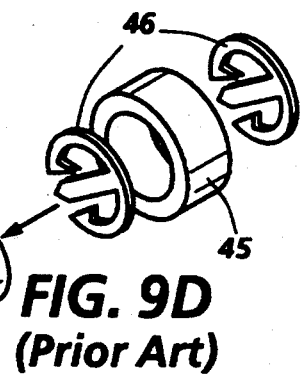
Figure 9E:
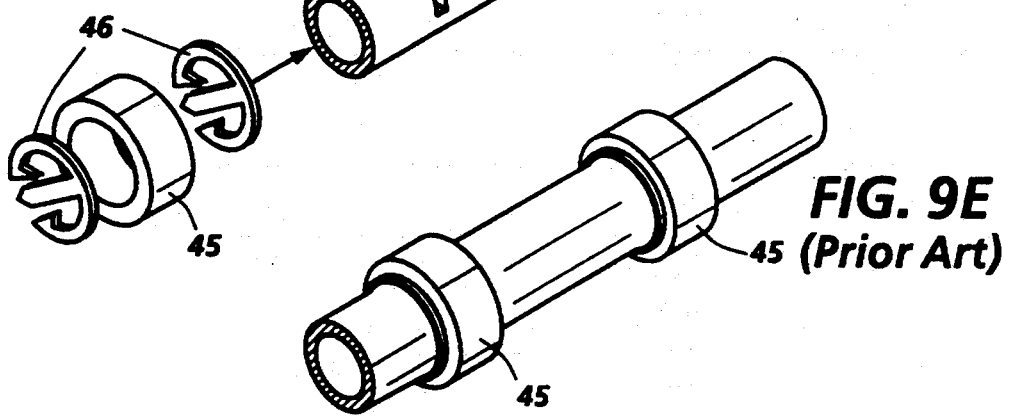

Attention is now directed to FIG. 5, wherein a shaft assembly 60 is illustrated which includes a large plastic frame or other tubular member 61. In addition, one end of the shaft assembly has a small solid portion 62 which may be useful in mounting purposes while the other end has a different portion 63. With reference to FIG. 6, a cross section through the hollow, tubular shell 30 which has been formed by extrusion, illustrates a geometric pattern 65 which may provide additional structural integrity to the shaft assembly. The geometric shape is preferably selected to take advantage of the shrink rate of the plastic to compensate for shrinkage throughout the core and thereby enhance the strength of the shaft assembly. FIG. 7 illustrates in cross section a coating 68 formed during a second molding operation on the shaft assembly, wherein the coating such as a molded elastomer is provided on the surface of the first integrally molded feature such as a roll 69. It should be emphasized that roll 69 was previously formed on the shell like portion 30 by having its core 29 and molding gates 31 filled with hardenable, flowable material according to the practice of the present invention. FIG. 8 illustrates in cross section another alternative embodiment of the present invention, wherein a separately fabricated feature such as roll 72, has been placed on the shell like portion 30 and secured thereto by hardened, moldable material in the core 29 which is in communication with roll securing slots or grooves 74 through aperture gates 31 through the shell 30 from the inside surface 42 to the outside surface 32. Typically this process would be used when molding process being is employed to provide an integrally molded functional feature on the shaft assembly. It should also be noted that any other feature which is formed in other conventional metal forming or shaping processes, such as turning, milling swaging and bulge forming may be used in the manufacture of this shaft assembly.

Accordingly, a new lightweight, low cost shaft assembly has been provided. In addition, the manufacturing process facilitates the rapid manufacturability and assembly of a shaft assembly having a plurality of functional features. It is a simple process in which the number of parts used in a shaft assembly as well the weight of the shaft assembly are dramatically reduced. Reductions in weight without sacrificing strength of up to about 60 percent have been achieved for this manufacturing process and reductions in manufacturing costs have been dramatically reduced to of the order at times of 25 to 30 percent of original manufacturing costs.

The patents specifically referred to herein are hereby incorporated in their entirety by reference.

While the invention has been described with reference to a shaft assembly useful in electrostatographic printing machine, it will be understood to those skilled in the art that it may be used in virtually any machine performing a function which requires the use of a rotatable shaft member. Accordingly, it is intended to embrace all such alternatives and modifications as may fall within the spirit and scope of the appended of claims.

I claim:

1. A shaft assembly comprising an elongated member having at least a portion which is tubular, shell like having an inside surface defining a shaft core and an outside surface defining a shaft functional surface, and including at least one molding aperture gate extending through said shaft from said inside surface to said outside surface, said shaft core being filled with a hardened, moldable material, said shaft functional surface having at least one functional feature thereon, which is of hardened, moldable material integrally molded with the hardened, moldable material in said shaft core and connected thereto by hardened, moldable material in said molding gate, said hardened, moldable material being a thermoplastic resin and wherein the coefficient of thermal expansion of the tubular, shell like portion and the shrink rate of the thermoplastic resin are selected to provide intimate contact between the hardened thermoplastic resin and tubular shell like portion.

2. The shaft assembly of claim 1 wherein said hollow, tubular, shell like portion is generally circular in cross section.

3. The shaft assembly of claim 1 wherein said thermoplastic resin contains up to about 30 parts by weight of glass fibers per 100 parts by weight thermoplastic resin.

4. The shaft assembly of claim 1 wherein the intimate contact is between the shaft functional surface and the molded functional feature.

5. The shaft assembly of claim 1 wherein said hollow, tubular, shell like portion is an extrusion having a geometrical pattern in its inside surface.

6. The shaft assembly of claim 1 including at least one functional feature which is not integrally molded with the hardened material in the shaft core but which is secured in place on said shaft by said hardened moldable material.

7. The shaft assembly of claim 1 wherein said shaft functional surface has more than one integrally molded functional feature thereon.

8. The shaft assembly of claim 7 wherein one of said more than one functional features performs a function different from at least one of the other functional features.

9. The shaft assembly of claim 7 wherein more than one of said functional features performs the same function.

10. The shaft assembly of claim 1 including an operative feature which has been molded onto said at least one functional feature.

11. The shaft assembly of claim 10 wherein said operative feature is a molded elastomer.

12. Apparatus comprising mechanical components capable of performing at least one operation requiring the use of a shaft assembly, said shaft assembly comprising an elongated member having at least a portion which is tubular, shell like having an inside surface defining a shaft core and an outside surface defining a shaft functional surface, and including at least one molding aperture gate extending through said shaft from said inside surface to said outside surface, said shaft core being filled with a hardened, moldable material, said shaft functional surface having at least one functional feature thereon, which is of hardened moldable material integrally molded with the hardened, moldable material in said shaft core and connected thereto by hardened, moldable material in said molding gate, said hardened, moldable material being a thermoplastic resin wherein the coefficient of thermal expansion of the tubular, shell like portion and the shrink rate of the thermoplastic resin are selected to provide intimate contact between the hardened thermoplastic resin and tubular shell like portion.

13. The apparatus of claim 12 wherein said hollow, tubular, shell like portion is generally circular in cross section.

14. The apparatus of claim 12 wherein said thermoplastic resin contains up to about 30 parts by weight of glass fibers per 100 parts by weight thermoplastic resin.

15. The apparatus of claim 12 wherein said shaft functional surface has more than one integrally molded functional feature thereon.

16. The shaft assembly of claim 15 wherein one of said more than one functional features performs a function different from at least one of the functional features.

17. The apparatus of claim 15 wherein more than one of said functional features performs the same function.

18. The apparatus of claim 12 wherein the intimate contact is between the shaft functional surface and the molded functional feature.

19. The apparatus of claim 12 wherein said hollow, tubular, shell like portion is an extrusion having a geometrical pattern in its inside surface.

20. The apparatus of claim 12 including at least one functional feature which is not integrally molded with the hardened material in the shaft core but which is secured in place on said shaft by said hardened moldable material.

21. The apparatus of claim 12 including an operative feature which has been molded onto said at least one functional feature.

22. The apparatus of claim 21 wherein said operative feature is a molded elastomer.

23. The apparatus of claim 12 wherein said shaft is rotatable.

* * * * *